(12) United States Patent
Kumar et al.

(10) Patent No.: US 11,294,772 B2
(45) Date of Patent: Apr. 5, 2022

(54) SYSTEM AND METHOD TO ACHIEVE VIRTUAL MACHINE BACKUP LOAD BALANCING USING MACHINE LEARNING

(71) Applicant: EMC IP Holding Company LLC, Hopkinton, MA (US)

(72) Inventors: Avinash Kumar, Bangalore (IN); Mahesh Reddy Appireddygari Venkataramana, Bangalore (IN); Elango Chockalingam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 393 days.

(21) Appl. No.: 16/560,926

(22) Filed: Sep. 4, 2019

(65) Prior Publication Data
US 2021/0064479 A1    Mar. 4, 2021

(51) Int. Cl.
*G06F 12/00* (2006.01)
*G06F 11/14* (2006.01)
(Continued)

(52) U.S. Cl.
CPC ...... *G06F 11/1461* (2013.01); *G06F 9/45558* (2013.01); *G06F 11/1451* (2013.01); *G06K 9/6256* (2013.01); *G06N 20/00* (2019.01); *G06F 2009/45562* (2013.01); *G06F 2009/45575* (2013.01)

(58) Field of Classification Search
CPC ............. G06F 11/1446; G06F 11/1448; G06F 11/1451; G06F 11/1453; G06F 11/1456; G06F 11/1458; G06F 11/1461; G06F 11/1464; G06F 11/1466; G06F 11/1469; G06F 11/1471; G06F 11/2053; G06F 11/2056; G06F 11/2058; G06F 11/2061; G06F 11/2064; G06F 11/2066; G06F 11/2069; G06F 11/2071; G06F 11/2074; G06F 11/2076; G06F 11/2079; G06F 11/2082; G06F 11/2084; G06F 11/2087; G06F 11/2089; G06F 11/2092; G06F 11/2094; G06F 9/45558;
(Continued)

(56) References Cited

U.S. PATENT DOCUMENTS 10,659,324 B2    5/2020    Pang
2014/0331277 A1    11/2014    Frascadore
(Continued)

*Primary Examiner* — Arvind Talukdar
(74) *Attorney, Agent, or Firm* — Chamberlain, Hrdlicka, White, Williams & Aughtry

(57) ABSTRACT

A method for performing a backup operation includes obtaining a backup request, wherein the backup request specifies a virtual machine (VM) set, and, in response to the backup request: identifying a first set of virtual machines (VMs), wherein the first set of VMs comprises a first portion of the VM set, performing a criticality analysis on the first set of VMs using a machine learning algorithm and a trained machine learning model to obtain an ordered list of critical VMs, performing a non-critical VM prioritization on a second set of VMs using the machine learning algorithm and the trained machine learning model to obtain an ordered list of non-critical VMs, consolidating the ordered list of critical VMs and the ordered list of non-critical VMs to obtain a final list, and initiating a backup of virtual machines using the final list.

20 Claims, 6 Drawing Sheets

(51) Int. Cl.
*G06K 9/62* (2022.01)
*G06F 9/455* (2018.01)
*G06N 20/00* (2019.01)

(58) Field of Classification Search
CPC    G06F 2009/45575; G06F 2009/45562; G06K 9/6256; G06N 20/00
See application file for complete search history.

(56) References Cited

U.S. PATENT DOCUMENTS

| | | |
|---|---|---|
| 2015/0128052 A1 | 5/2015 | Grehan |
| 2015/0301818 A1 | 10/2015 | Voronkov |
| 2017/0109191 A1 | 4/2017 | Bhasin |
| 2018/0039434 A1* | 2/2018 | Balcha .................... G06F 3/065 |
| 2018/0143879 A1* | 5/2018 | Dornemann .......... G06F 11/203 |
| 2019/0138350 A1 | 5/2019 | Kaneko |
| 2019/0377625 A1 | 12/2019 | Chintalapati |

\* cited by examiner

SYSTEM AND METHOD TO ACHIEVE VIRTUAL MACHINE BACKUP LOAD BALANCING USING MACHINE LEARNING

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a backup agent, a backup request, wherein the backup request specifies a virtual machine (VM) set, and, in response to the backup request: identifying a first set of virtual machines (VMs), wherein the first set of VMs comprises a first portion of the VM set, performing a critical VM prioritization on the first set of VMs using a machine learning algorithm and a trained machine learning model to obtain an ordered list of critical VMs, performing a non-critical VM prioritization on a second set of VMs using the machine learning algorithm and the trained machine learning model to obtain an ordered list of non-critical VMs, wherein the second set comprises a second portion of the VM set, consolidating the ordered list of critical VMs and the ordered list of non-critical VMs to obtain a final list, and initiating a backup of virtual machines using the final list.

In general, in one aspect, the invention relates to a system that includes a processor and memory that includes instructions which, when executed by the processor, perform a method for performing backup operations. The method includes obtaining, by a backup agent, a backup request, wherein the backup request specifies a virtual machine (VM) set, and, in response to the backup request: identifying a first set of virtual machines (VMs), wherein the first set of VMs comprises a first portion of the VM set, performing a critical VM prioritization on the first set of VMs using a machine learning algorithm and a trained machine learning model to obtain an ordered list of critical VMs, performing a non-critical VM prioritization on a second set of VMs using the machine learning algorithm and the trained machine learning model to obtain an ordered list of non-critical VMs, wherein the second set comprises a second portion of the VM set, consolidating the ordered list of critical VMs and the ordered list of non-critical VMs to obtain a final list, and initiating a backup of virtual machines using the final list.

In general, in one aspect, the invention relates to a non-transitory computer readable medium that includes computer readable program code, which when executed by a computer processor enables the computer processor to perform a method for performing a backup operation. The method includes obtaining, by a backup agent, a backup request, wherein the backup request specifies a virtual machine (VM) set, and, in response to the backup request: identifying a first set of virtual machines (VMs), wherein the first set of VMs comprises a first portion of the VM set, performing a critical VM prioritization on the first set of VMs using a machine learning algorithm and a trained machine learning model to obtain an ordered list of critical VMs, performing a non-critical VM prioritization on a second set of VMs using the machine learning algorithm and the trained machine learning model to obtain an ordered list of non-critical VMs, wherein the second set comprises a second portion of the VM set, consolidating the ordered list of critical VMs and the ordered list of non-critical VMs to obtain a final list, and initiating a backup of virtual machines using the final list.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to performing an efficient backup operation on a large number of virtual machines using machine learning that is used to identify critical virtual machines and prioritizing the critical virtual machines over non-critical virtual machines.

Further, various embodiments of the invention relate to tagging the non-critical virtual machines with a priority tag to further generate an order for backing up a set of virtual machines. Further, various embodiments of the invention may identify virtual machines in a powered-off or orphaned state and remove virtual machines in such states from the set such that the virtual machines in such states are not backed up.

Figure 1:
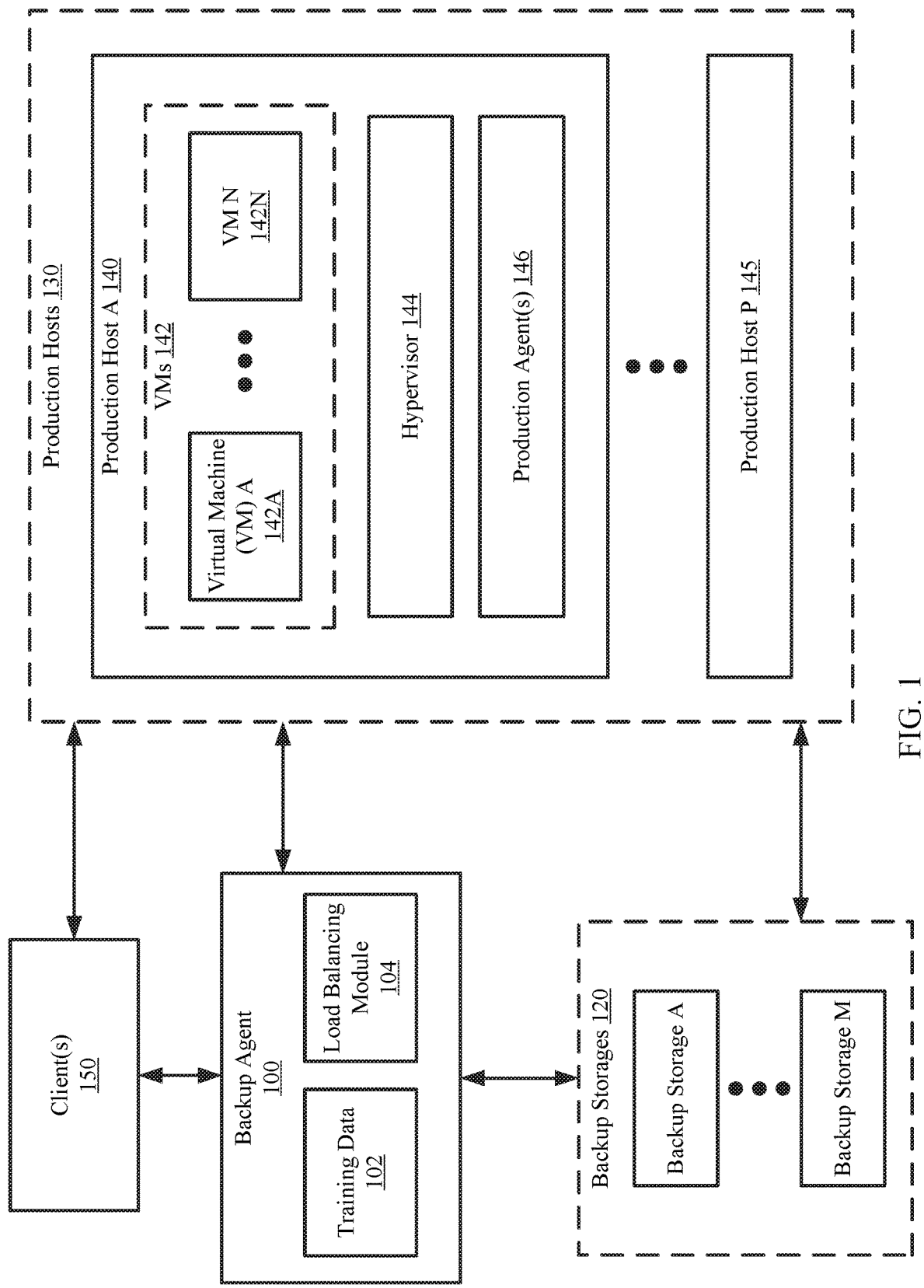
FIG. 1 shows a diagram of a system in accordance with one or more embodiments of the invention.

FIG. 1 shows an example system in accordance with one or more embodiments of the invention. The system includes a backup agent (100), one or more production hosts (130) and backup storages (120). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the backup agent (100) manages the protection of data generated by the production hosts (130). The backup agent may manage the protection of data by implementing backup policies for virtual machines (142) executing on the production hosts (140). The backup policies may specify how to back up the virtual machines (142) and to store the backups in the backup storages (120).

In one or more embodiments of the invention, the backup agent uses a machine learning algorithm in combination with a trained machine learning model to determine an ordering of virtual machines for a backup operation. The machine learning algorithm is a function(s) that specifies relationships between VM characteristics (defined below). The relationships may be associated with one or more parameters. The values of the parameters are determined using the training data and stored in a trained machine learning model. The trained machine learning model may be obtained in accordance with FIG. 2A. The trained machine learning model may be a data structure that specifies values of parameters that are used in the machine learning algorithm.

Figure 2A:
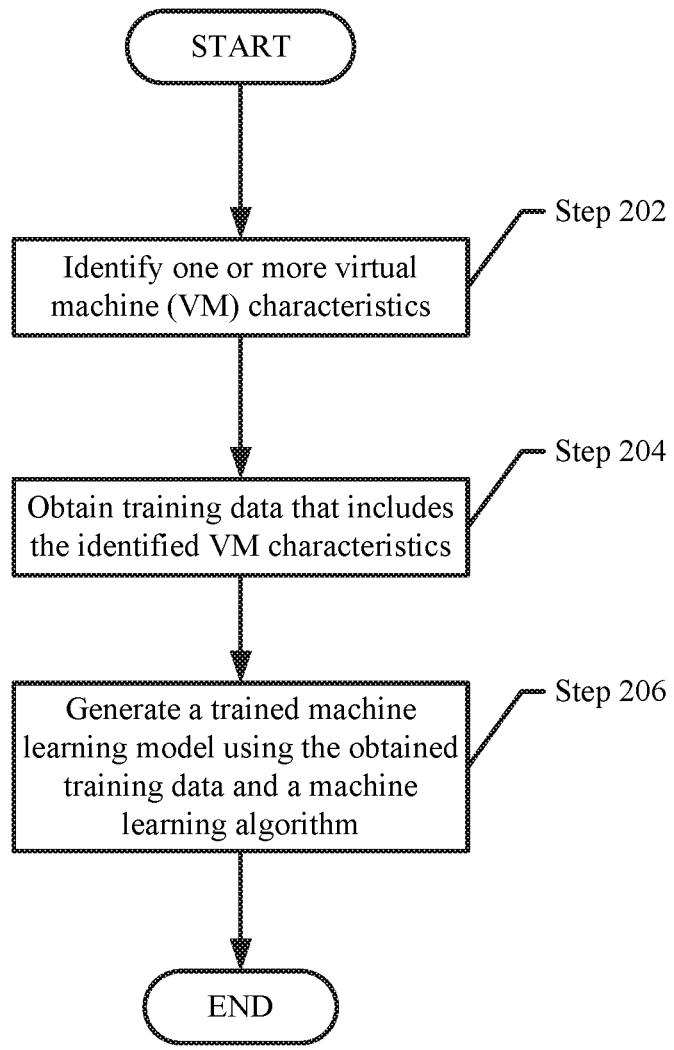
FIG. 2A shows a flowchart for generated a trained machine learning model in accordance with one or more embodiments of the invention.
Figure 2B:
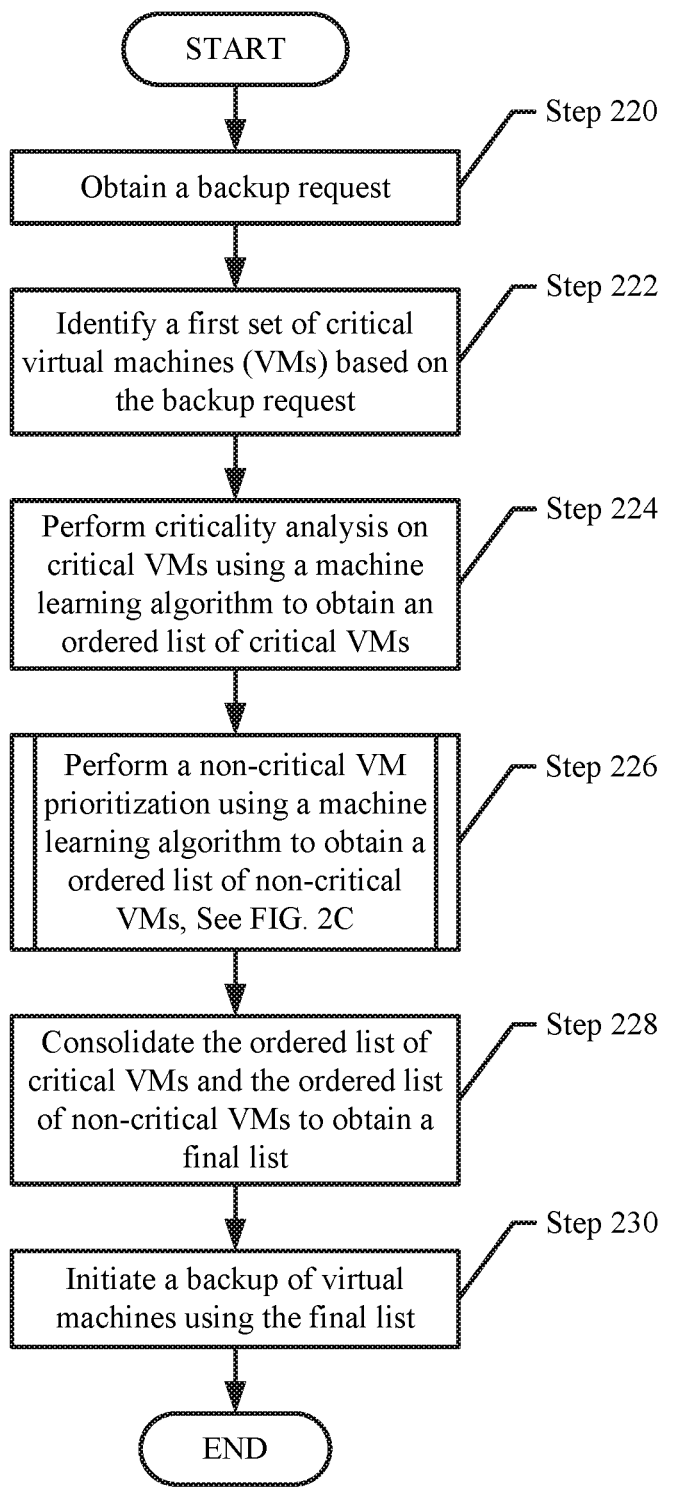
FIG. 2B shows a flowchart for managing backup requests in accordance with one or more embodiments of the invention.
Figure 2C:
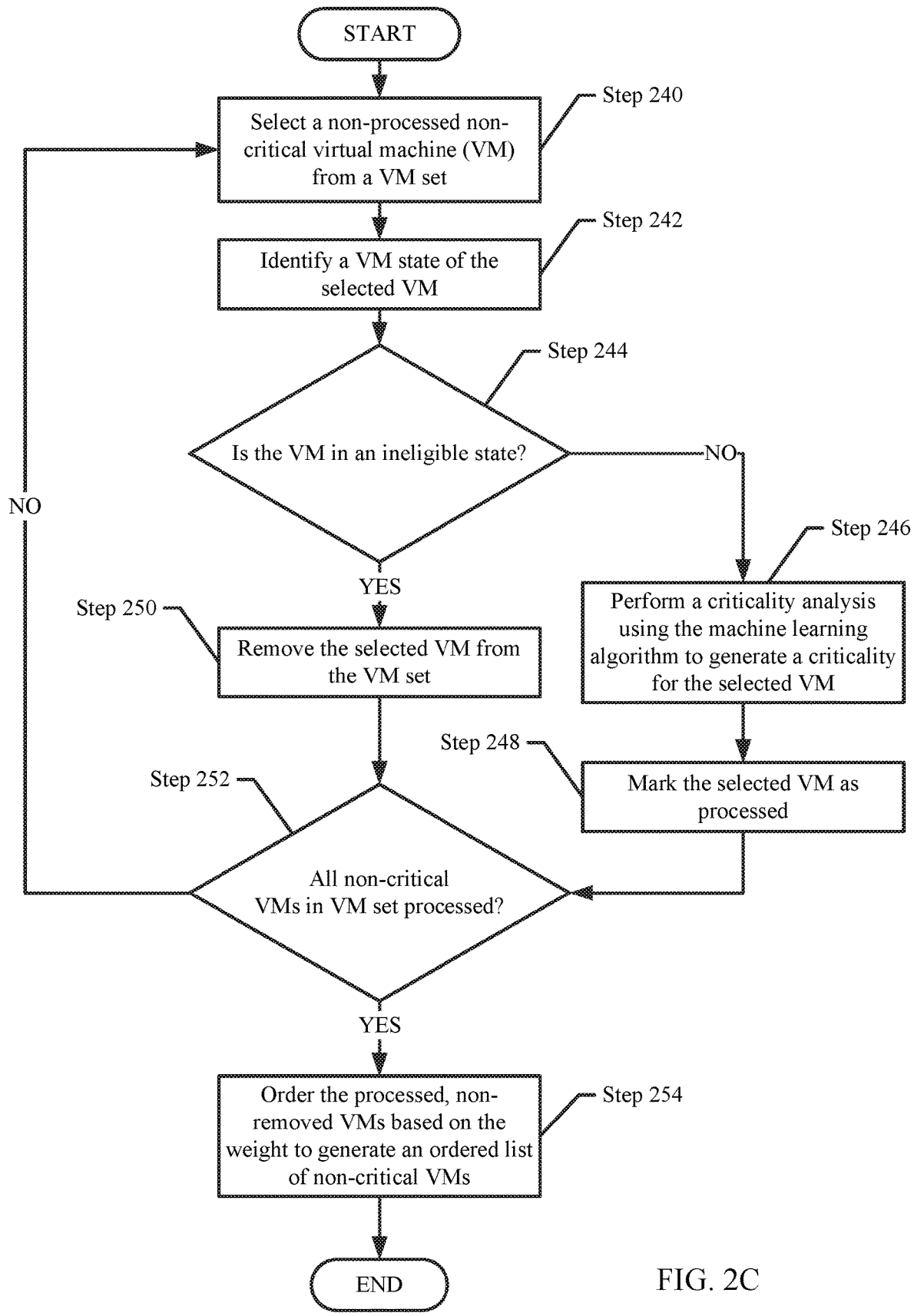
FIG. 2C shows a diagram for performing a non-critical VM prioritization in accordance with one or more embodiments of the invention.

The load balancing module (104) may use the machine learning algorithm and the trained machine learning model to determine a criticality of a virtual machine based on one or more parameters and use the criticality of each virtual machine to generate an ordering of a set of virtual machines in accordance with FIGS. 2B-2C.

In one or more embodiments of the invention, a VM with a high criticality is a VM that is very important to be protected. A critical VM may be a VM with a high importance in ensuring that the VM is backed up when requested. The criticality of a VM may be determined based on a number of parameters such as, for example, a rate of input/output operations (IOPs), a number of users using the VM, an explicit designation by one or more users, and/or other parameters without departing from the invention.

In one or more embodiments of the invention, the load balancing module (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the load balancing module (104) described throughout this application.

In one or more embodiments of the invention, the load balancing module (104) is implemented as computer instructions, e.g., computer code, stored on a persistent storage that when executed by a processor of the backup agent (100) cause the backup agent (100) to provide the functionality of the load balancing module (104) described throughout this application and/or all, or a portion thereof, of the method illustrated in FIGS. 2A-2C.

Figure 4:
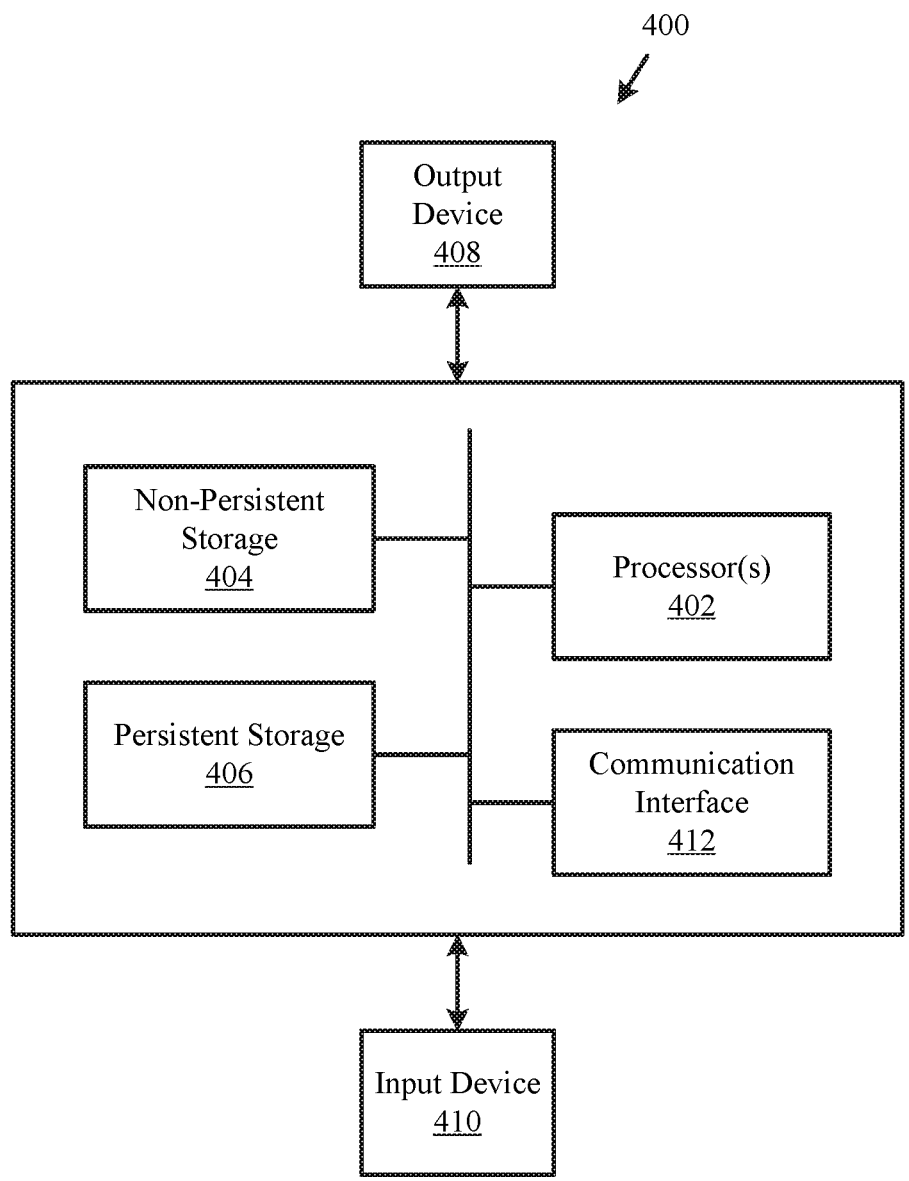
FIG. 4 shows a diagram of a computing device in accordance with one or more embodiments of the invention.

In one or more embodiments of the invention, the backup agent (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this application and/or all, or a portion thereof, of the methods illustrated in FIGS. 2A-2C.

In one or more embodiments of the invention, the backup agent (100) is implemented as a logical device. The logical device may utilize the computing resources of any number of computing devices and thereby provide the functionality of the backup agent (100) described throughout this application and/or all, or a portion thereof, of the methods illustrated in FIGS. 2A-2C.

In one or more embodiments of the invention, the client(s) (150) utilize services provided by the production hosts (130) and/or the backup agent (100). Specifically, the client(s) (150) may utilize the virtual machines (142) to obtain, modify, and/or store data. The data may be generated from applications hosted in the virtual machines (142). Further, the client(s) (150) may utilize the backup agent (100) to initiate backups of the virtual machines (e.g., 142). The client(s) may trigger a backup operation performed by the backup agent (100) by sending a backup request to the backup agent (100) that specifies one or more virtual machines.

In one or more embodiments of the invention, a client (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (150) described throughout this application.

In one or more embodiments of the invention, the client(s) (150) are implemented as a logical device. The logical device may utilize the computing resources of any number of computing devices and thereby provide the functionality of the client(s) (150) described throughout this application.

In one or more embodiments of the invention, the production hosts (130) host virtual machines (VMs) (142). The VMs (142) may be logical entities executed using computing resources (not shown) of the production host (130). Each of the virtual machines (142A, 142N) may be performing similar or different processes. In one or more embodiments of the invention, the VMs (142) provide services to users, e.g., clients (150). For example, the VMs (142) may host components. The components may be, for example, instances of databases, email servers, and/or other applications. The VMs (142) may host other types of components without departing from the invention.

In one or more embodiments of the invention, each virtual machine may be identified using a VM identifier. The VM identifier may be a string of numbers, letters, symbols, or any combination thereof that uniquely identifies each virtual machine. The VM identifier may be generated by a client (e.g., 150) operated by a user.

In one or more embodiments of the invention, the VM identifier may also include specific information about the VM such as, for example, that the VM is a critical VM. In such scenarios, the VM identifier may also include a string "critical" and/or other information that may indicate that it is a critical VM.

In one or more embodiments of the invention, the production hosts (130) each include a hypervisor (144) that orchestrates the operation of the VMs (142). The hypervisor (144) may orchestrate the operation of the VMs (142) by allocating computing resources to each virtual machine (142A, 142N).

Further, the hypervisor (144) may provide information about the virtual machines (142) of a production host (e.g., 140) to the backup agent (100) as requested by the backup agent (100), during periodic intervals, after a change in the system is detected by the hypervisor (100), and/or based on any other occurrence without departing from the invention. The information may be used as training data by the load balancing module (104) of the backup agent (100).

In one or more embodiments of the invention, the hypervisor (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (144) described throughout this application.

In one or more of embodiments of the invention, the hypervisor (144) is implemented as computer instructions, e.g., computer code, stored on a persistent storage that when executed by a processor of the production host (140) cause the production host (140) to provide the functionality of the hypervisor (144) described throughout this application.

In one or more embodiments of the invention, the production host (140) includes one or more production agents (146). A production agent may include functionality for generating backups of one or more virtual machines (142A, 142N), storing the backups in the backup storages (120), and/or obtaining the backups from the backup storages (120) when restoring the virtual machines (142A, 142N).

In one or more embodiments of the invention, the production agent(s) (146) may each perform backups of virtual machines in backup sessions. In one or more embodiments of the invention, a backup session is an operation performed by a production agent that includes backing up a predetermined number of virtual machines during the same period of time. The number of virtual machines that may be backed up in a backup session may be determined by, for example, a hypervisor (144), a client (e.g., 150), and/or any other entity without departing from the invention. The number of virtual machines backed up in a backup session may be based on the computing resources available to the production agent performing the backup session.

In one or more embodiments of the invention, the production agent (146) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (146) described throughout this application.

In one or more of embodiments of the invention, the production agent (146) is implemented as computer instructions, e.g., computer code, stored on a persistent storage that when executed by a processor of the production host (140) causes the production host (140) to provide the functionality of the production agent (146) described throughout this application.

In one or more embodiments of the invention, the virtual machines (142) are implemented as computer instructions, e.g., computer code, stored on a persistent storage (e.g., on a production host (140)) that when executed by a processor(s) of the production host (140) cause the production host (140) to provide the functionality of the virtual machines (142) described throughout this application.

In one or more embodiments of the invention, each of the production hosts (140, 145) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (140, 145) described throughout this application.

In one or more embodiments of the invention, each of the production hosts (140, 145) is implemented as a logical device. The logical device may utilize the computing resources of any number of computing devices and thereby provide the functionality of the production host (140, 145) described throughout this application.

In one or more embodiments of the invention, the backup storages (120) store backups of the virtual machines (142). The backup storages (120) may communicate with the production agents (e.g., 146) of each production host when obtaining backups to be stored and/or when transferring backups to the production hosts (130) when restoring virtual machines. In one or more embodiments of the invention, a backup is a copy of data associated with a virtual machine. A backup may further include additional data that enables a production agent to restore a virtual machine associated with the backup from any production host.

In one or more embodiments of the invention, each of the backup storages (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage described throughout this application.

In one or more embodiments of the invention, each of the backup storages (120) is implemented as a logical device. The logical device may utilize the computing resources of any number of computing devices and thereby provide the functionality of the backup storage described throughout this application.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for generating a trained machine learning model in accordance with one or more embodiments of the invention. The method shown in FIG. 2A may be performed by, for example, a backup agent (100, FIG. 1). Other components of the system illustrated in FIG. 1 may perform the method of FIG. 2A without departing from the invention.

In step 202, virtual machine (VM) characteristics are identified. In one or more embodiments of the invention, a VM characteristic is a feature of a virtual machine that is used to determine a criticality of the virtual machine when performing a backup of the virtual machine. The VM characteristics of a virtual machine may be, for example, a rate of change of data in the virtual machine, a vulnerability of the virtual machine (i.e., a frequency in which the virtual machine has been restored), an input/output operations (IOPs) rate, a state of the VM (described below), and a time of most recent backup time of the VM. Other VM characteristics may be specified without departing from the invention.

Each virtual machine may be identified as being in a state. Examples of a state of the virtual machine may include, but are not limited to: (i) powered on, (ii) powered off, (iii) stale, (iv) orphaned, and (v) unmodified. The virtual machines may be in other states without departing from the invention.

In one or more embodiments of the invention, a virtual machine in a stale state is a virtual machine for which there is minimal to no IOPs for a large period of time. The large period of time may be predetermined by the backup agent, by a client, or by any other entity without departing from the invention.

In one or more embodiments of the invention, a virtual machine in an orphaned state is a virtual machine that has been removed from a production host environment (e.g., fully or partially deleted from a production host) and/or otherwise unavailable for future use.

In one or more embodiments of the invention, a virtual machine in an unmodified state is a virtual machine that has not been modified since a last backup was performed on the virtual machine.

In one or more embodiments of the invention, the VM characteristics may be identified using a request sent by a client, or other entity, that specifies the VM characteristics to be used for training a machine learning model. Each identified VM characteristic may be used as a parameter for a machine learning algorithm to train the machine learning model.

The selection of VM characteristics (also referred to as features) may be performed using any known or later discovered method for feature selection.

In step 204, training data is obtained. In one or more embodiments of the invention, the training data is data used by the backup agent to train the machine learning model. The training data may include a data set that includes data points where each data point specifies one or more VM characteristics and an associated criticality. The criticality may be, for example, a numerical value that is associated with a virtual machine based on how critical it is for the virtual machine to be backed up.

In one or more embodiments of the invention, the training data is obtained from a client managing the training of the machine learning model. The client may generate the data set and send the data set to the backup agent.

In one or more embodiments of the invention, the training data is obtained from virtual machine (VM) data. The VM data may be obtained from the production hosts hosting the virtual machines. The VM data may be a data set that includes information about the virtual machines. The information may be, for example, IOPs usage, backup frequency (i.e., how often a virtual machine is backed up), a state of the VM, a production host, and/or any other information without departing from the invention.

In one or more embodiments of the invention, the training data is a subset of the obtained VM data. In other words, the VM data may include a portion of information that includes the identified VM characteristics and a second portion of information that is different from the VM characteristics. The backup agent may analyze the VM data to generate the training data based on the identified VM characteristics.

In step 206, a trained machine learning model is generated using the machine learning algorithm and the training data. In one or more embodiments of the invention, the trained machine learning model is obtained by providing the training data as an input to the machine learning algorithm and producing parameters associated with each VM characteristic (which may also be referred to as a feature in the machine learning algorithm) The result is one or more parameters.

In one or more embodiments of the invention, the machine learning algorithm is a multiple linear regression algorithm. In one or more embodiments of the invention, the multiple linear regression algorithm is a function that models a linear relationship between multiple inputs (e.g., VM characteristics) and an output (e.g., criticality of VM). In various embodiments of the invention and prior to performing the training in step 206, the machine learning algorithm is customized to include the selected features (which in this embodiment correspond to the selected VM characteristics). The training data is then applied to the customized machine learning algorithm to determine the appropriate parameters. The training may be determined to be completed when a set of input from the training data that is processed by the customized machine learning algorithm with the learned parameters results in a critically that matches (or is similar) to the criticality in the training data.

For example, if the training data includes VM characteristics [VMC1, VMC2, VMC3] with a corresponding criticality of five, then the training may be determined to be completed when the result of inputting [VMC1, VMC2, VMC3] into the customized machine learning algorithm with the learned parameters results in a critically is five (or criticality that is deemed to be similar to five).

The determination of whether a criticality is similar for purposes of determining whether training is complete may be determined on a per-implementation basis.

The training in step 206 may be iteratively performed to generate the final parameters in the trained machine learning model. In this scenario, the values of one or more parameters may be modified at each iteration until the final parameters are determined.

While FIG. 2A describes the machine learning algorithm as a multi-linear regression algorithm, other machine learning algorithms may be used without departing from the invention. For example, the invention may be implemented using one of the following other machine learning algorithms without departing from the invention: Linear Regression, Logistic Regression, Decision Tree, SVM, Naive Bayes, kNN, K-Means, Random Forest, Dimensionality Reduction Algorithms, and Gradient Boosting algorithms.

While FIG. 2A describes the backup agent generating the trained machine learning model, in other embodiments of the invention, the separate computing device(s) (see e.g., FIG. 4) may perform all or a portion of the steps in FIG. 2A and provide the trained machine learning model to the backup agent.

FIG. 2B shows a flowchart for performing a backup operation in accordance with one or more embodiments of the invention. The method shown in FIG. 2B may be performed by, for example, a backup agent (100, FIG. 1). Specifically, the method of FIG. 2B may be performed by a load balancing module (104, FIG. 1A) of the backup agent. Other components of the system illustrated in FIG. 1 may perform the method of FIG. 2B without departing from the invention.

In step 220, a backup request is obtained. In one or more embodiments of the invention, the backup request specifies a set of virtual machines (also referred to as a VM set) to be backed up. The backup request may be obtained from a client.

In step 222, a first set of critical VMs to back up are identified based on the backup request. In one or more embodiments of the invention, the first set of critical VMs is identified by analyzing each VM specified in the set of VMs and determining whether a critical tag has been applied to the VM. The critical tag may be applied by the backup agent during a preliminary VM analysis. This analysis may be performed separately from the method shown in FIG. 2B and prior to step 222.

Alternatively, the critical tag may be identified in a VM identifier that includes a string of numbers, letters, or any combination thereof that deems a VM critical. For example, a VM identifier may include the string "critical" as a part of the VM identifier. The backup agent may determine that any virtual machine with an associated VM identifier that includes the string "critical" may be identified as a critical VM.

Each VM identified as a critical VM (using any embodiment of the invention) may be included in the first set of critical VMs.

In step 224, a criticality analysis is performed on the first set of VMs using a machine learning algorithm and the trained machine learning model to obtain an ordered list of critical VMs. In one or more embodiments of the invention, the backup agent includes information about each VM. The information includes one or more VM characteristics of the critical VM. The VM characteristics are used as input into the machine learning algorithm (which is using the trained machine learning model) to generate a criticality of the VM. The critical VMs may be ordered based on the criticality of each critical VMs. In other words, the critical VM with the highest criticality is first in the order; the critical VM with the next highest criticality is second in the order, etc. In this manner, the result is an ordered list of critical VMs.

In step 226, a non-critical VM prioritization is performed to obtain an ordered list of non-critical VMs.

The non-critical VM prioritization may be performed via the method illustrated in FIG. 2C. The non-critical VM prioritization may be performed via other methods without departing from the invention.

In step 228, the ordered list of critical VMs and the ordered list of non-critical VMs are consolidated to obtain a final list. In one or more embodiments of the invention, the final list is ordered with the ordered list of critical VMs listed first followed by the ordered list of non-critical VMs listed. In this manner, during the backup operation, the critical VMs are backed up first.

In step 230, a backup of virtual machines is initiated using the final list. In one or more embodiments of the invention, the backup is initiated by sending requests to one or more production agents hosted in the production host to back up the corresponding virtual machines in an order based on the final list.

For example, a final list may specify backing up VMs 1-100 in an ascending order based on the number (i.e., VM 1 first and VM 100 last). A first production agent may be hosted on a production host hosting VMs 1, 5, and 10, and a second production agent may be hosted on a production host hosting VMs 2, 15, and 40. The backup agent may send a request to the production agent to back up VMs 1, 5, and 10 in the specified order (i.e., VM 1, then VM 5, then VM 10) and send a second request to the second production agent to back up VMs 2, 15, and 40 in the specified order (i.e., VM 2, then VM 15, then VM 40). The backup may be initiated via other methods without departing from the invention.

In one or more embodiments of the invention, prior to initiating the backup, the backup agent sends the final list to a client for verification and/or modification. The client, operated by a user, analyzes the order of the final list and either confirms the order of the list or modifies the list based on the user's analysis of the order. The final list may be updated based on the modification(s), and the updated list is returned to the backup agent. The backup agent may update the training data using the updated final list. Further, the backup agent may initiate the backup using the updated list.

In one or more embodiments of the invention, the backup agent sends the final list to the client after initiating the backup. In such scenario, the backup is initiated based on the final list, but the client, operated by a user, analyzes the order of the final list and either confirms the order of the list or modifies the list based on the user's analysis of the order. The final list may be updated based on the modification(s), and the updated list is returned to the backup agent. The backup agent may update the training data using the updated final list.

The updated training data may then be used to update one or more parameters in the trained machine learning model.

FIG. 2C shows a flowchart for performing a non-critical VM prioritization in accordance with one or more embodiments of the invention. The method shown in FIG. 2C may be performed by, for example, a backup agent (100, FIG. 1). Specifically, the method of FIG. 2C may be performed by a load balancing module (104, FIG. 1A) of the backup agent. Other components of the system illustrated in FIG. 1 may perform the method of FIG. 2C without departing from the invention.

In step 240, a non-processed non-critical VM is selected from the VM set.

In step 242, a VM state of the selected VM is identified. In one or more embodiments of the invention, the state of the VM may be identified by accessing information about the VM and identifying a state of the VM. Alternatively, the state of the VM is specified in the VM identifier.

In step 244, a determination is made about whether the VM is in an ineligible state. As discussed above, an ineligible state of the VM may include, for example, an off state, an orphaned state, or a stale state. If the VM is in an ineligible state, the method proceeds to step 248; otherwise, the method proceeds to step 246.

In step 246, a criticality analysis is performed on the selected VM using the machine learning algorithm and the trained machine learning model to generate a criticality for the selected VM. The criticality analysis performed in step 246 is the same or substantially similar to step 224.

In step 248, the selected VM is marked as processed. The method then proceeds to step 252.

In step 250, the selected VM is removed from the VM set. In this manner, the selected VM is not to be backed up. The method then proceeds to step 252.

In step 252, a determination is made about whether all non-critical VMs in the VM set are processed. If all non-critical VMs in the VM set are processed, the method proceeds to step 254; otherwise, the method proceeds to step 240.

In step 254, the processed, non-removed VMs are ordered based on the criticality determined in step 246 generate an ordered list of non-critical VMs. In one or more embodiments of the invention, the processed, non-removed VMs are ordered from highest criticality to lowest criticality. In this manner, the more "critical" of the non-critical VMs are prioritized to be backed up before less "critical" non-critical VMs.

Example 1

Figure 3:
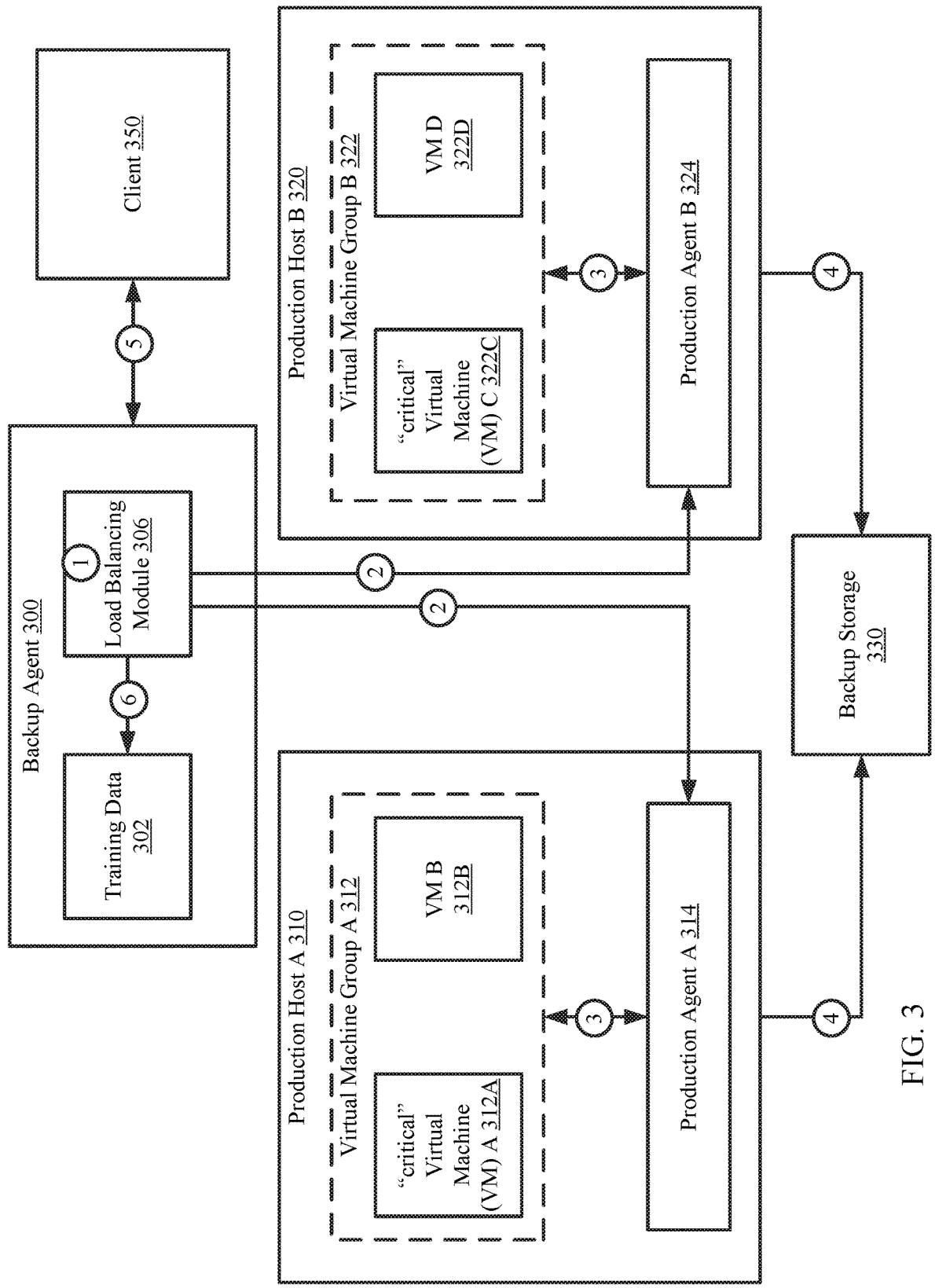
FIG. 3 shows an example in accordance with one or more embodiments of the invention.

The following section describes an example. The example, illustrated in FIG. 3, is not intended to limit the invention. Turning to the example, consider a scenario in which a system is performing a backup operation on virtual machines. The system may include a backup agent (300), two production hosts (310, 320), and a backup storage (330). The backup agent (300) includes training data (302) and a load balancing module (306).

The backup agent (300) obtains a backup request that specifies a VM set. The VM set may specify VMs A (312A), B (312B), C (322C), and D (322D). The backup agent (300) performs the method of FIG. 2B to obtain a final list of VMs [1]. Specifically, the backup agent (300) identifies a set of critical VMs based on the VM identifiers. The VM identifiers that include the string of letters "critical" are included in the set of critical VMs.

The load balancing module (306) of the backup agent (300) subsequently applies a machine learning algorithm (using the trained machine learning model) (previously obtained using the training data (302)) to VM characteristics of each critical VM (312A, 322C) to obtain a criticality of each critical VM. The critical VMs are ordered based on the criticality of each critical VM. The result of applying the machine learning algorithm that the order of the critical VMs is [VM A (312A), VM C (322C)].

The load balancing module further performs the method of FIG. 2C to the remaining VMs (312B, 322D) (i.e., the non-critical VMs). Specifically, the load balancing module determines whether each non-critical VM is in an ineligible state. The load balancing module, identifies that each non-critical VM (312B, 322D) is in an on state and, as such, determines that neither of the non-critical VMs is in an ineligible state. After the aforementioned determination is performed, the load balancing module performs a criticality analysis using the machine learning algorithm (using the trained machine learning model) (previously obtained using the training data (302)) to obtain a criticality of each non-critical VM. Based on the criticality of each non-critical VM (312B, 322D), the load balancing module (306) determines The result of applying the machine learning algorithm that the order of the critical VMs is [VM B (312B), VM D (322D)].

Based on the ordering of the critical VMs (312A, 322C) and the non-critical VMs (312B, 322D), the load balancing module (306) generates a final list that includes the following order [VM A (312A), VM C (322C), VM B (312B), VM D (322D)].

After the final list is generated, the load balancing module (306) initiates a backup of the VMs (312A, 312B, 322C, 322D). The load balancing module sends a request to each production agent (314, 324) of the production hosts (310, 320) to back up the VMs in an order based on the final list [2]. Production agent A (314) obtains a request that specifies backing up VM A (312A) (a critical VM) first, followed by VM B (312B). Further, production agent B (324) obtains a request that specifies backing up VM C (322C) (a critical VM) first, followed by VM D (322D).

Each production agent (314, 324) subsequently performs the respective backup operation on the VMs (312A, 312B, 322C, 322D) [3]. The backups are stored in the backup storage (330) [4].

After the load balancing module (306) initiates the backup, the backup agent (300) sends a notification to the client (350) that specifies the final list. The client (350) modifies the list to have non-critical VM D (322D) have a higher criticality than non-critical VM B (312B) [5]. The backup agent (300) obtains the modified list and stores this information in the training data (302) [6].

End of Example 1

Example 2

The following section describes an example. Consider a scenario in which a VM set that specifies a large number (i.e., 1000) of virtual machines operating in a virtual environment are to be backed up. Each virtual machine is associated with 100 gigabytes (GB) of data. Within the 1000 virtual machines, 100 of those virtual machines are labeled as "critical" within their respective VM identifiers. Additionally, within the 1000 virtual machines, 100 are in a stale state and another 100 are in a powered off state. In the environment hosting the virtual machines, there are five production agents that perform the backups of the virtual machines. Each production agent is equipped to perform backups of 25 virtual machines in one backup session. In other words, each production agent is able to back up 25 virtual machines at one time. In total, the first back session may be able to backup up to 125 virtual machines.

Without embodiments of the invention, the virtual machines are assigned to each production agent in an unspecified order and all virtual machines are backed up regardless of whether a virtual machine is ineligible for backup. This approach results in the production agents spending a total of 13.33 hours to perform the 1000 backups. Further, the probability that all 100 critical VMs are backed up within the first backup session of 125 virtual machines is very small (i.e., less than 0.001%) based on random ordering of the VM set. This may be problematic in the event that the backup operation is interrupted during the backup operation.

This probability only decreases if the total number of VMs in the VM set increases while the number of critical VMs remains at 100.

In contrast, when implementing a backup operation on the same set of 1000 VMs using embodiments of the invention, the probability of all 100 critical VMs being backed up in the first backup session of 125 VMs increases to 100% because they are prioritized first. Additionally, the backup agent implementing the load balancing module removes the ineligible VMs (i.e., the 100 stale VMs and the 100 off VMs). In this manner, only the 800 VMs in the VM set that need to be backed up are backed up. This reduces the total time taken to perform the backup operation to 10.66 hours.

End of Example 2

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing a backup operation by intelligently ordering virtual machines to be backed up based on characteristics of the virtual machines. Embodiments of the invention include separating VMs initially identified to be critical from non-critical VMs and ordering the VMs in the critical VM set (using a machine learning algorithm) independently from the non-critical VM set. The VMs in the critical set are backed up first in the determined order, followed by the non-critical VMs in the determined order. By intelligently ordering the VMs prior to generating the backups, embodiments of the invention are able to increase the likelihood that critical VMs have been backed up in the event that a disruption occurs during the backup operation.

Further, embodiments of the invention identify virtual machines that do not need to be backed up by identifying a state of each VM. In this manner, the time used to back up a large number of virtual machines is reduced because VMs that do not need to be backed up are not backed up.

Thus, embodiments of the invention may address the problem of inefficient use of computing resources. This problem arises due to the technological nature of the environment in which backups are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
    obtaining, by a backup agent, a backup request, wherein the backup request specifies a virtual machine (VM) set; and
    in response to the backup request:
        identifying a first set of virtual machines (VMs), wherein the first set of VMs comprises a first portion of the VM set;
        performing a critical VM prioritization on the first set of VMs using a machine learning algorithm and a trained machine learning model to obtain an ordered list of critical VMs;
        performing a non-critical VM prioritization on a second set of VMs using the machine learning algorithm and the trained machine learning model to obtain an ordered list of non-critical VMs, wherein the second set comprises a second portion of the VM set;
        consolidating the ordered list of critical VMs and the ordered list of non-critical VMs to obtain a final list; and
        initiating a backup of virtual machines using the final list.

2. The method of claim 1, further comprising:
    identifying at least one virtual machine (VM) characteristic;
    obtaining VM data;
    obtaining training data using the at least one VM characteristic and the VM data; and
    generating the trained machine learning model using the machine learning algorithm and the training data.

3. The method of claim 2, wherein the machine learning algorithm is a multi-linear regression model.

4. The method of claim 2, wherein the training data is a subset of the VM data.

5. The method of claim 1, wherein performing the non-critical VM prioritization on the second set of VMs using the machine learning algorithm to obtain the ordered list of non-critical VMs comprises:
   identifying a portion of the second set of VMs that specifies VMs in an ineligible state;
   removing the portion from the second set of VMs to obtain a third set of VMs;
   obtaining a criticality for each VM of the third set of VMs; and
   ordering, using the criticality, each VM of the third set of VMs to generate the ordered list of non-critical VMs.

6. The method of claim 5, wherein the ineligible state is at least one of: an orphaned state, a stale state, and an off state.

7. The method of claim 1, wherein initiating the backup of virtual machines using the final list comprises sending a second request to at least one production agent executing on a production host hosting a plurality of virtual machines, wherein the second request specifies an order of the plurality of virtual machines based on the final list.

8. A system, comprising:
   a processor; and
   memory comprising instructions which, when executed by the processor, perform a method, the method comprising:
      obtaining, by a backup agent, a backup request, wherein the backup request specifies a virtual machine (VM) set; and
      in response to the backup request:
         identifying a first set of virtual machines (VMs), wherein the first set of VMs comprises a first portion of the VM set;
         performing a critical VM prioritization on the first set of VMs using machine learning algorithm and a trained machine learning model to obtain an ordered list of critical VMs;
         performing a non-critical VM prioritization on a second set of VMs using the machine learning algorithm and the trained machine learning model to obtain an ordered list of non-critical VMs, wherein the second set comprises a second portion of the VM set;
         consolidating the ordered list of critical VMs and the ordered list of non-critical VMs to obtain a final list; and
         initiating a backup of virtual machines using the final list.

9. The system of claim 8, the method further comprising:
   identifying at least one virtual machine (VM) characteristic;
   obtaining VM data;
   obtaining training data using the at least one VM characteristic and the VM data; and
   generating the trained machine learning model using the machine learning algorithm and the training data.

10. The system of claim 9, wherein the machine learning algorithm is a multi-linear regression model.

11. The system of claim 9, wherein the training data is a subset of the VM data.

12. The system of claim 8, wherein performing the non-critical VM prioritization on the second set of VMs using the machine learning algorithm to obtain an ordered list of non-critical VMs comprises:
   identifying a portion of the second set of VMs that specifies VMs in an ineligible state;
   removing the portion from the second set of VMs to obtain a third set of VMs;
   obtaining a criticality for each VM of the third set of VMs; and
   ordering, using the criticality, each VM of the third set of VMs to generate the ordered list of non-critical VMs.

13. The system of claim 8, wherein initiating the backup of virtual machines using the final list comprises sending a second request to at least one production agent executing on a production host hosting a plurality of virtual machines, wherein the second request specifies an order of the plurality of virtual machines based on the final list.

14. A non-transitory computer readable medium comprising computer readable program code, which when executed by a computer processor enables the computer processor to perform a method for performing a backup operation, the method comprising:
   obtaining, by a backup agent, a backup request, wherein the backup request specifies a virtual machine (VM) set; and
   in response to the backup request:
      identifying a first set of virtual machines (VMs), wherein the first set of VMs comprises a first portion of the VM set;
      performing a critical VM prioritization on the first set of VMs using a machine learning algorithm and a trained machine learning model to obtain an ordered list of critical VMs;
      performing a non-critical VM prioritization on a second set of VMs using the machine learning algorithm and the trained machine learning model to obtain an ordered list of non-critical VMs, wherein the second set comprises a second portion of the VM set;
      consolidating the ordered list of critical VMs and the ordered list of non-critical VMs to obtain a final list; and
      initiating a backup of virtual machines using the final list.

15. The non-transitory computer readable medium of claim 14, the method further comprising:
   identifying at least one virtual machine (VM) characteristic;
   obtaining VM data;
   obtaining training data using the at least one VM characteristic and the VM data; and
   training a machine learning algorithm using the training data to obtain the trained machine learning model.

16. The non-transitory computer readable medium of claim 15, wherein the machine learning algorithm is a multi-linear regression model.

17. The non-transitory computer readable medium of claim 15, wherein the training data is a subset of the VM data.

18. The non-transitory computer readable medium of claim 14, wherein performing the non-critical VM prioritization on the second set of VMs using the machine learning algorithm to obtain an ordered list of non-critical VMs comprises:
   identifying a portion of the second set of VMs that specifies VMs in an ineligible state;
   removing the portion from the second set of VMs to obtain a third set of VMs;

obtaining a criticality for each VM of the third set of VMs; and ordering, using the criticality, each VM of the third set of VMs to generate the ordered list of non-critical VMs.

19. The non-transitory computer readable medium of claim 18, wherein the ineligible state is at least one of: an orphaned state, a stale state, and an off state.

20. The non-transitory computer readable medium of claim 14, wherein initiating the backup of virtual machines using the final list comprises sending a second request to at least one production agent executing on a production host hosting a plurality of virtual machines, wherein the second request specifies an order of the plurality of virtual machines based on the final list.

* * * * *